United States Patent [19]
Huber et al.

[11] 4,268,203
[45] May 19, 1981

[54] RECEIVING AND COLLECTING PIECES OF STOCK SUCH AS RODS OR TUBES

[75] Inventors: Walter Huber; Wolfgang Stratenhoff, both of Muelheim, Fed. Rep. of Germany

[73] Assignee: Mannesmann Aktiengesellschaft, Duesseldorf, Fed. Rep. of Germany

[21] Appl. No.: 63,752

[22] Filed: Aug. 6, 1979

[30] Foreign Application Priority Data
Aug. 7, 1978 [DE] Fed. Rep. of Germany ....... 2834874

[51] Int. Cl.³ ................................................ B65G 1/08
[52] U.S. Cl. ..................................... 414/100; 414/900
[58] Field of Search ......... 414/98, 99, 100, DIG. 900; 100/212; 193/2 C; 209/933; 53/236

[56] References Cited
U.S. PATENT DOCUMENTS

| | | | |
|---|---|---|---|
| 2,592,642 | 4/1952 | Bardet | 414/100 X |
| 2,767,536 | 10/1956 | Forkel | 53/236 |
| 3,950,920 | 4/1976 | Thomsen et al. | 414/100 X |

FOREIGN PATENT DOCUMENTS
1208238 12/1965 Fed. Rep. of Germany ........ 414/99

Primary Examiner—Allen N. Knowles
Attorney, Agent, or Firm—Smyth, Pavitt, Siegemund & Martella

[57] ABSTRACT

At the end of a downwardly slanted track, a duct of S-shaped cross section is provided to receive tubes and rods. The duct wall members are cushioned and can be tilted apart; belts are disposed across the bottom of the duct and are gradually released to form receiving loops which increase in size accordingly, for holding and bundling the tubes or rods.

4 Claims, 3 Drawing Figures

RECEIVING AND COLLECTING PIECES OF STOCK SUCH AS RODS OR TUBES

BACKGROUND OF THE INVENTION

The present invention relates to a device for receiving and collecting tubes, rods, or the like, i.e., elongated stock, as it arrives on a track or the like; and more particularly, the invention relates to the noise reduction of, in, and for such a device.

The German patent No. 12 08 238 discloses a device of the type referred to above. The particular device is constructed from belts. The tubes arrive on an inclined path and are stepwise lowered under utilization of control means which include a light barrier. Edges and inclined path could be covered by a material which reduces noise, so that the travelling tubes as they arrive do not make much noise.

It was found to be troublesome that upon being placed onto a pile of tubes in the device, the dropping tube as it hits others produces a considerable amount of noise. This problem has not been solved in a satisfactory manner. Particularly, as a tube is being lowered onto the pile, it may roll into a different position and that produces more often than not a considerable amount of noise.

DESCRIPTION OF THE INVENTION

It is an object of the present invention to provide for a new and improved device for collecting and receiving tubes, rods, or the like, in which the development of noise is reduced and suppressed.

It is a more general object of the present invention to reduce the production of noise upon placing tubes or rods on top of each other.

It is a specific object of the present invention to place rods or tubes into a well-organized bundle, one at a time, and with little development of noise.

In accordance with the preferred embodiment of the present invention, it is suggested to provide a curved duct adjacent to the end of a slanted track on which the tubes or rods arrive; they will move down in the duct, being preferably defined by two S-shaped members which must be lined with noise-attenuating material, and preferably one of them is pivotably mounted. Belts extend across the bottom of that duct and are gradually paid to form loops which increase as more tubes or rods arrive. Generally speaking, the duct should be adjustable with regard to its width, to match the outer diameter of the respective stock. Throughout, the tubes or rods are packed in the bundle and the bundle increases in size without the tubes or rods loosing contact with each other.

The preferred embodiment of the invention, the objects and features of the invention, and further objects, features and advantages thereof, will be better understood from the following description taken in connection with the accompanying drawings.

Figure 1:
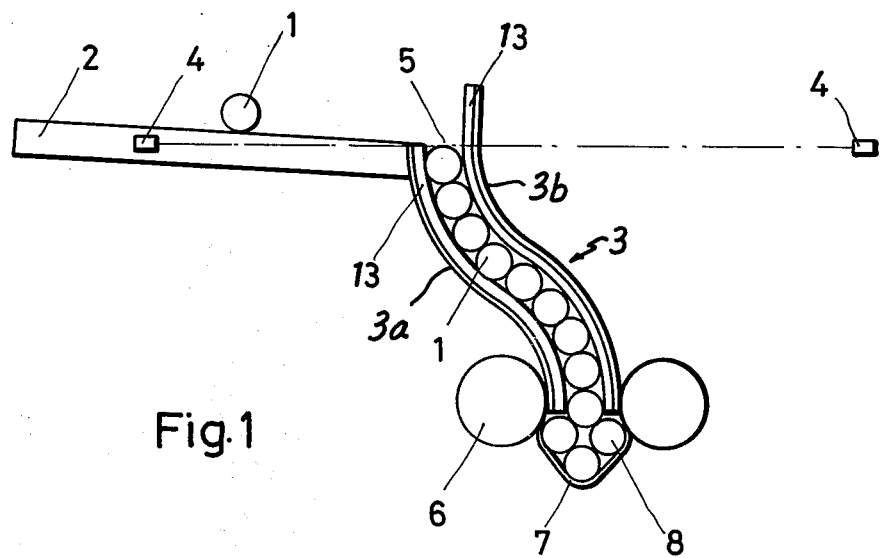
FIG. 1 is a schematic side view of a tube or rod collecting and receiving the device improved in accordance with the preferred embodiment of the invention, the device being shown in the beginning of a collecting and receiving operation.

Proceeding now to the detailed description of the drawings, the figures show a grating 2, track, or the like, which is inclined and on which rods or tubes 1 roll in downward direction. A chute/channel structure 3 is provided at the end of track 2, being comprised of two S-shaped members 3a and 3b, the latter extending above the plane of the track to serve as a barrier.

Together, members 3a and 3b define the duct or channel 3 of generally vertical orientation with a lateral offset on account of the S-shaped structure. Members 3a and 3b define an entrance opening 5 for duct 3, located adjacent to the end of track 2. The two members 3a and 3b carry noise-attenuating, cushioning linings 13, made for example from felt or plastic.

The member 3a may be affixed to track 2, while member 3b is mounted to the top of an arm 10 which, in turn, is pivoted on a frame and mounting part 11. Upon pivoting arm 10, one can actually adjust the distance between members 3a and 3b from each other to, thereby, adjust the width of the gap of duct 3.

The member 3b could be pivotally mounted on (and locked to) the top of arm 10 to compensate for any inequality in gap width on account of the pivot motion of arm 10 (rather than a lateral shift). In any event, the gap and width of duct 3 can be adjusted to match closely the outer diameter of the particular type of tubes and rods that will arrive. Lining 13 may actually serve as a brake.

The tube or rod receiving equipment proper is comprised of belts 7, having, for example, one end each affixed to arm 10. Each belt, when extended, forms a receiving loop, and loops up and over pulleys such as 6 and towards pay-out and pick-up reels such as 9. The payout of the belts is controlled indirectly by a light barrier 4 which extends its beam across entrance 5 of duct 3. The reels 9 are driven by a reversible motor 19 which, in turn, is controlled by a controller 20. The light barrier provides an input for the controller.

The device operates as follows: Originally, the belts are held to span more or less straight across the bottom outlet of duct 3 in order to serve as bottom proper. Tubes or rods 1 arrive, roll down track 2, and are stopped by the upright extending portion of number 3b. The cushioning layer on that member prevents the development of noise upon impact. The tube or rod now drops into the chute or duct 3, rolls down, and is held by the belts across the duct's exit. This "loading" of the duct with rods or tubes will proceed until duct 3 is filled which state is monitored by light barrier 4, since the beam interruption is not a temporary one but persists. The state of filling could be detected otherwise, for example, by counting the number of pieces of stock which have dropped into the duct. As stated, the width of the duct is adjustable and should be rather tight, so that the downward movement of any rod or tube is frictionally retarded by the noise-attenuating lining 13, and there is little impact noise as the chute or duct fills.

Upon sensing, or otherwise detecting, the condition of a filled chute, the control 20 for reel drive 19 will cause reel 9 to pay and to release a short, additional length of belt so that a loop is formed which receives the lowermost rod or tube. Thus, the uppermost rod or tube will drop a little which frees the light barrier.

Figure 2:
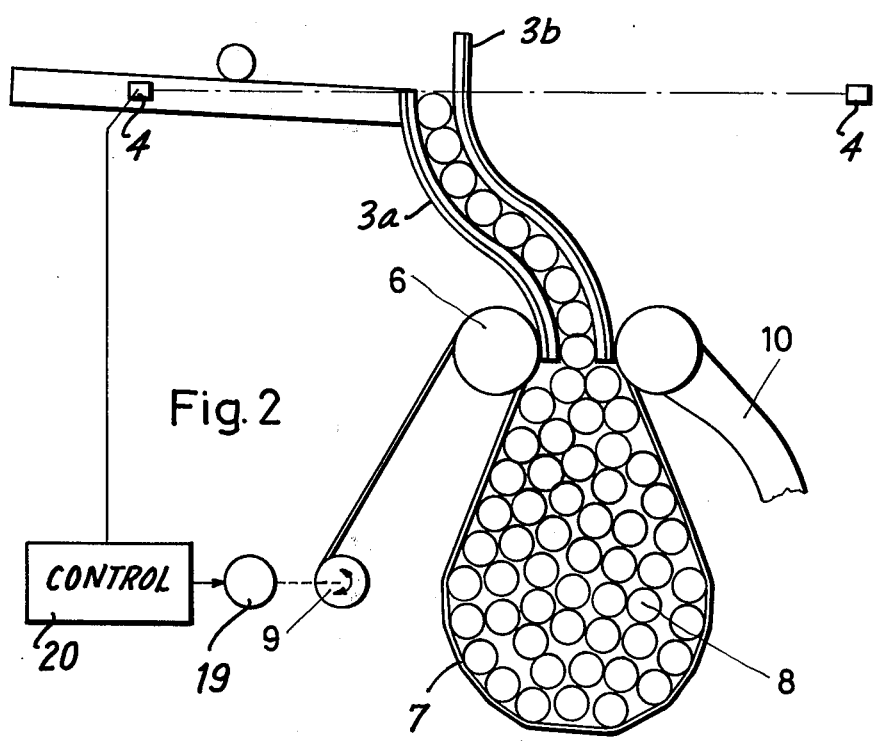
FIG. 2 is a similar view of the device as shown in FIG. 1, but upon completion of filing.

It can readily be seen that this operation continues as additional tubes or rods arrive one by one. Each interruption of barrier 4 now causes belt reel 9 to yield a little more slack so that soon a small pocket is formed as shown in FIG. 1, while after a period of time the tubes or rods form a bundle 8 as shown in FIG. 2.

The gradual increase in loop size makes sure that the rods settle into new positions and assume gradually new positions in the bundle as it is formed, whereby very little noise develops. The belts hold the tubes or rods tightly in the bundle and slack is given to the belts gradually, so that the tubes and rods can gently settle into any new portions, while just one new piece of stock leaves chute 3 and becomes part of the bundle. It should be noted particularly that rods or tubes do not fall onto each other, and holding by the belts ensures throughout that at no time will any piece of stock fall out of the bundle, down, alongside others, etc. The tubes, etc., remain always in supporting or supported contact with each other or with the belt.

Figure 3:
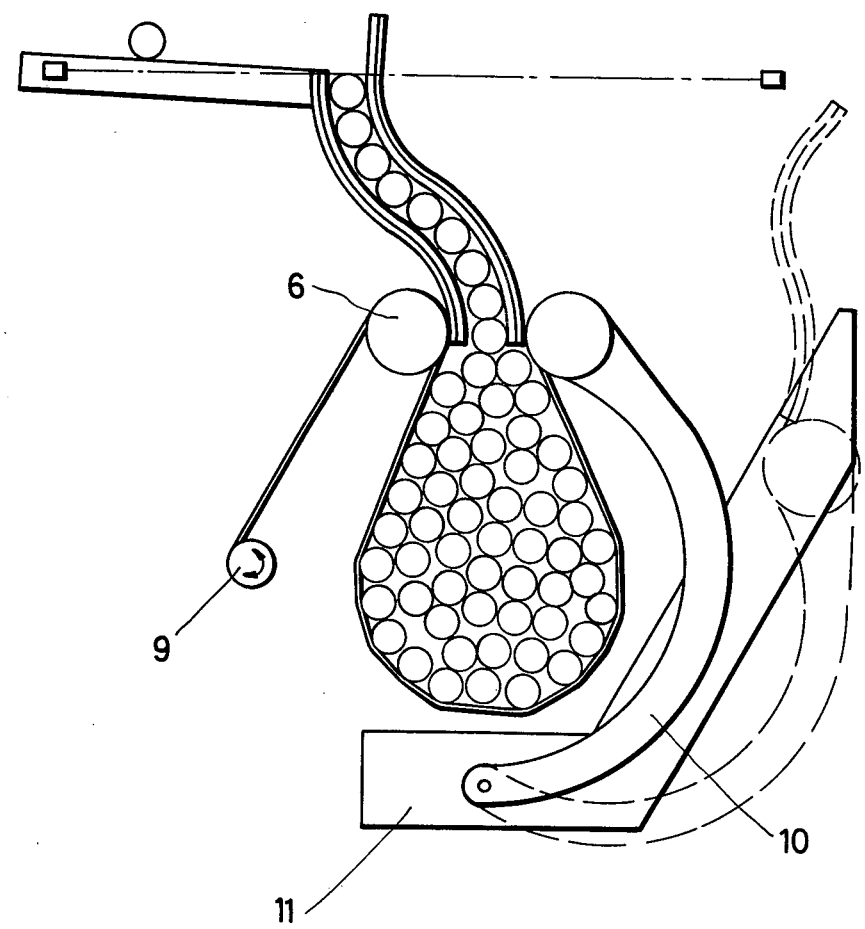
FIG. 3 shows the device of FIG. 1, with an open part for removal of the collected tubes.

After so many tubes or rods have been packed into the bundle (the maximum being given by the belt length and the strength and number of the belts, the weight of the rods or tubes, etc.), further supply is stopped, but the belts are still extended further to empty chute 3 completely. Thereafter, arm 10 swings back (clockwise, shown in FIG. 3), and the bundle is made to rest against the slanted arm or plate 11a of frame 11. Conceivably, one takes up a little slack of the belts as arm, or arms, 10 swing back if that is advantageous for low-noise handling of the particular stock.

The bundle is thereafter taken up in any convenient manner, and the belts are retracted for the next bundling cycle.

The invention is not limited to the embodiments described above, but all changes and modifications thereof not constituting departures from the spirit and scope of the invention are intended to be included.

We claim:

1. Low-noise, tube- or rod-collecting and bundling device to be placed adjacent to the end of a slanted track means, comprising:

means, defining a curved duct and having its upper entrance disposed at said end and having members being stationary during operation and covered with a noise-attenuating material, the duct having a width corresponding to the diameter of the tubes or rods and further having a lower exit;

a plurality of extendable belts disposed for extending adjacent to said exit, there being means for paying out the belts to obtain loops below the exit; and means for increasing the size of the loops so that the belt loops receive the tubes or rods as they arrive on the track and through the duct.

2. Collecting device as in claim 1, wherein the width of the duct is adjustable to the width of the rods or tubes for stacking them therein until they are being placed inside said loops.

3. Device as in claim 1 or 2, the duct being defined by two members, one of them being mounted on a means for pivoting.

4. Device as in claim 1, the duct being defined by two members, one of them facing the end of the track means as barrier adjacent to the said upper entrance.

* * * * *